United States Patent
Getreuer et al.

(10) Patent No.: US 6,961,291 B2
(45) Date of Patent: Nov. 1, 2005

(54) SYSTEM FOR ENHANCED ASTIGMATIC FOCUS SIGNAL DETECTION

(75) Inventors: Kurt Walter Getreuer, Colorado Springs, CO (US); Ronald Paul Stahl, Castle Rock, CO (US)

(73) Assignee: Plasmon LMS, Inc., Colorado Springs, CO (US)

( * ) Notice: Subject to any disclaimer, the term of this patent is extended or adjusted under 35 U.S.C. 154(b) by 132 days.

(21) Appl. No.: 10/115,304

(22) Filed: Apr. 3, 2002

(65) Prior Publication Data

US 2003/0189882 A1 Oct. 9, 2003

(51) Int. Cl.[7] .............................................. G11B 7/00
(52) U.S. Cl. ............................. 369/44.24; 369/112.23; 369/118
(58) Field of Search ........................... 369/44.23, 44.24, 369/53.28, 94, 112.22, 112.23, 118, 120

(56) References Cited

U.S. PATENT DOCUMENTS

| | | | |
|---|---|---|---|
| 5,703,861 A | 12/1997 | Matsuda | |
| 5,801,880 A | 9/1998 | Matsuda et al. | |
| 5,811,789 A | 9/1998 | Nix | |
| 5,993,930 A | 11/1999 | Hector et al. | |
| 6,091,496 A | 7/2000 | Hill | |
| 6,091,690 A * | 7/2000 | Sano et al. | 369/44.23 |
| 6,683,838 B2 * | 1/2004 | Jutte | 369/112.24 |

* cited by examiner

Primary Examiner—Paul W. Huber
(74) Attorney, Agent, or Firm—Oppenheimer Wolff & Donnelly LLP

(57) ABSTRACT

An auto-focus system for a DVD reader or other optical access unit which reads and/or writes information from/to at least two information layers on an optical storage medium such as a DVD or DVR. The auto-focus system includes an astigmatic lens. A confocal aperture is placed at the first focal line image generated by the astigmatic lens from light rays reflected from the addressed information layer. The placement of the confocal aperture allows extraneous out-of-focus light rays reflected from non-addressed information layers to be blocked from reaching the photo detector array which then creates a focus error signal (FES). The FES drives a servo assembly connected to an access head of the optical access unit, bringing the access head into focus. In some embodiments, the confocal aperture is "bow-tie" shaped, allowing for simplified assembly and easing in-plane rotational alignment.

18 Claims, 5 Drawing Sheets

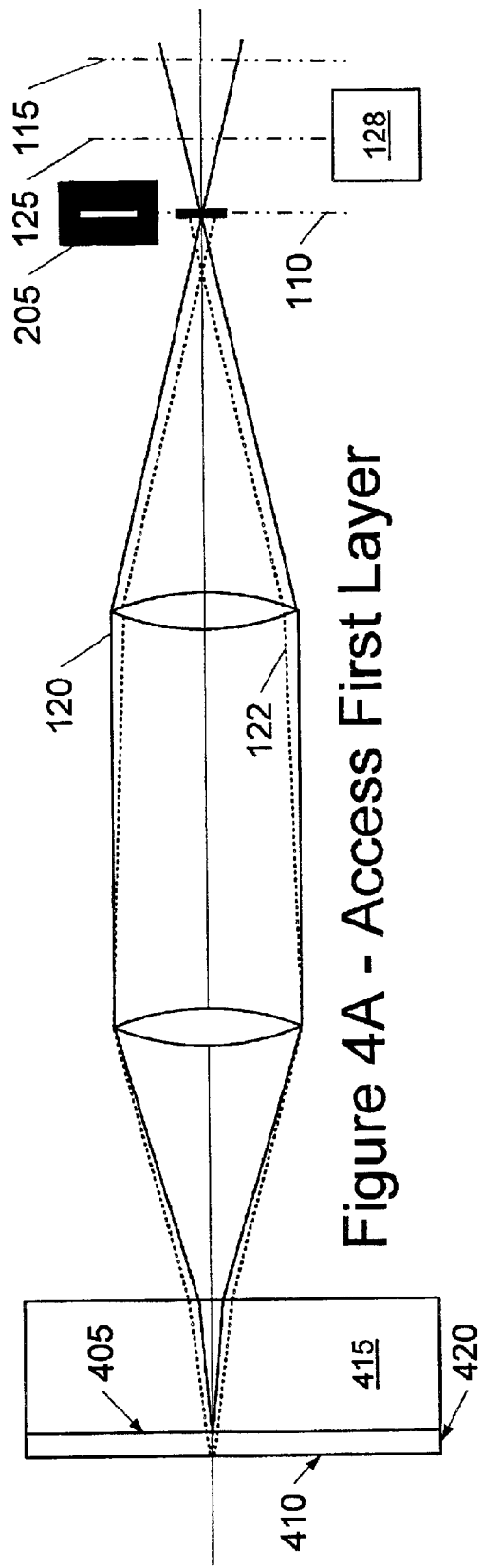
Figure 4A - Access First Layer
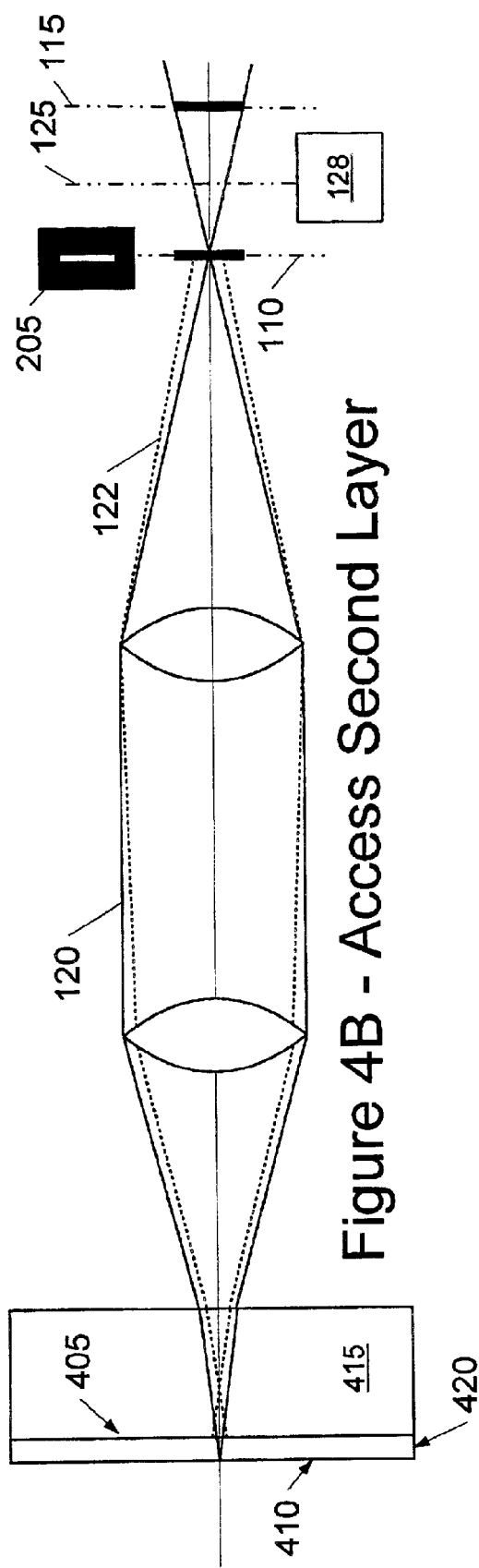
Figure 4B - Access Second Layer

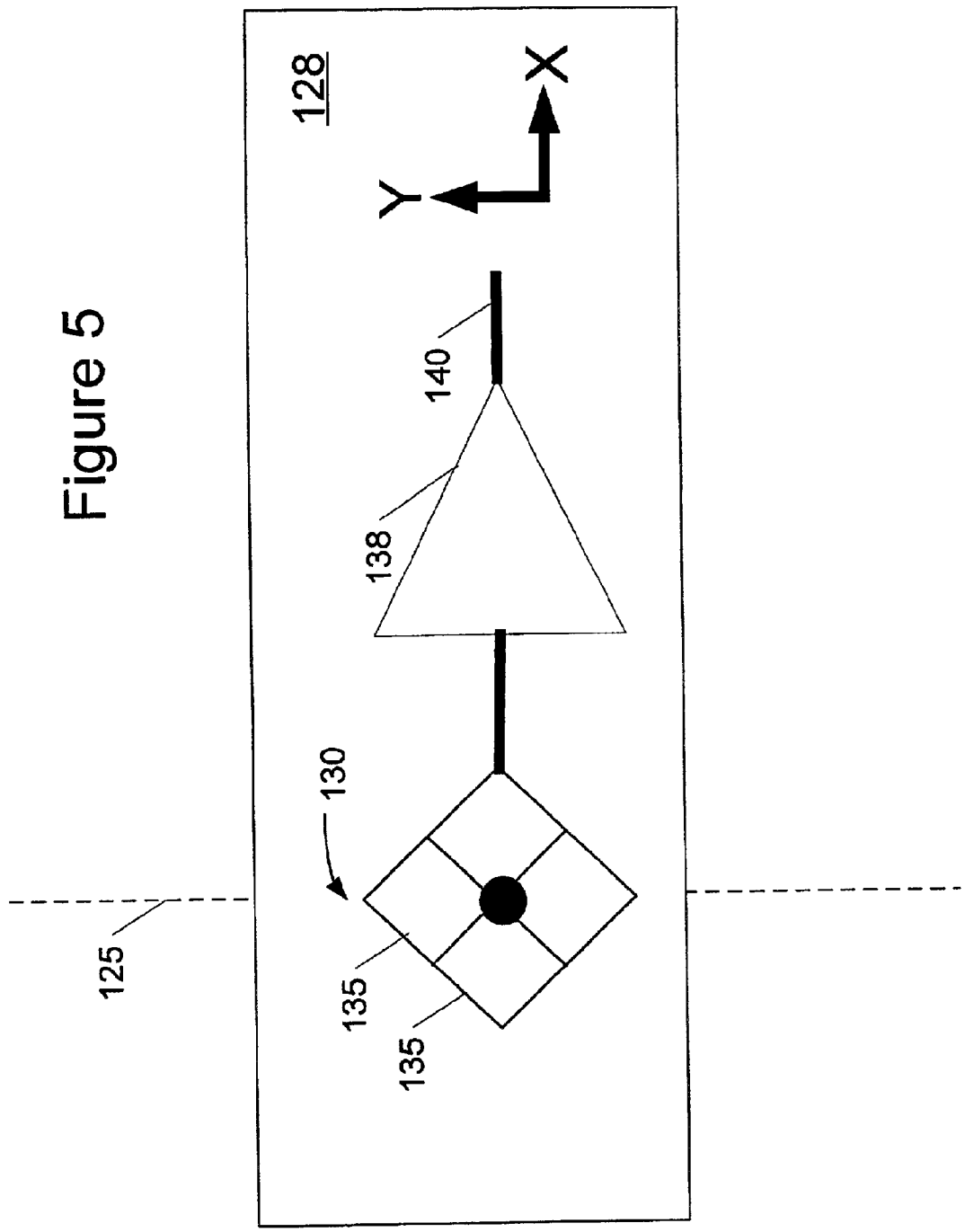

SYSTEM FOR ENHANCED ASTIGMATIC FOCUS SIGNAL DETECTION

BACKGROUND OF THE INVENTION

This invention relates generally to optical storage. Particularly, this invention relates to a system providing enhanced astigmatic focus signal detection using a confocal aperture.

In October 2000, a study released out of the University of California, Berkeley reported that it took the entire history of humankind until the year 1999 to accumulate 12 exabytes of information (where 1 exabyte equals 1,000,000,000,000,000,000 bytes), which is 50,000 times the size of the Library of Congress. The study estimates that this amount of accumulated information will double by the middle of the year 2002. The incredible recent growth in the production of information has made the demand for information management tremendous.

Over the course of computing history, various methods of information storage have been used. Currently, optical storage is particularly popular, both because it is a removable storage means (in contrast to hard disk drives) and because it offers high capacity at a reasonable cost. Of course, as with many industries, competition is focused on three factors: bigger, faster, and cheaper. With respect to "bigger," optical disk manufacturers strive to provide higher capacity disks. Currently, an everyday CD-ROM or CD-RW can store about 600 megabytes of information while a single-sided DVD traditionally can store 4,700 megabytes (i.e., 4.7 GB). However, the recent arrival of dual-layer optical technology was a jump for disk capacity. By writing and reading data encoded on two different depths or layers of the disk, capacity essentially doubled. For example, a dual-layer DVD can store 8,500 megabytes (i.e., 8.5 GB) per side. U.S. Pat. No. 5,993,930 to Hector et al. teaches one approach to a dual-layer optical medium having a multi-layered spacer layer between reflecting layers.

Multi-layer optical systems have new problems not necessarily present in the standard single-layer systems. For example, in a single layer system, the access head must be focused, and remain focused, on the sole information-carrying layer. Unfortunately, optical disks are not perfectly flat. As the disk spins during operation, the disk can tilt. These and other aberrations result in the information layer varying in distance from the access head and thus causing a need for the optical system to perform auto-focusing corrections. There are a handful of standard approaches to providing auto-focusing functionality to an optical storage system, including the astigmatic, Foucault, critical angle method, and differential methods. Of this group, the astigmatic method is perhaps most widely used.

In an astigmatic auto-focusing system, the objective lens of the access head is connected to a feedback mechanism which keeps the access head in focus with respect to the spinning and imperfectly flat optical disk. The signal which controls the feedback mechanism is often created by a photodiode array. Between the optical disk and the photo array is placed an astigmatic lens. As reflected light from the disk passes through this astigmatic lens, a system which is out of focus will create a light spot which is elliptical on the photo array. By sensing which direction the light is elliptically elongated, the photo array creates the appropriate signal to move the access head further from or closer to the optical disk, thus bringing it into focus.

In systems having more than one information-carrying layer, it is necessary not only to maintain focus on the current information layer, but to configure the access head to be able to selectively focus on any of the layers. For example, in a dual layer disk, the head will need to focus sometimes on the first layer and sometimes on the second layer. Astigmatic focusing has been adopted to assist with this need. For example, U.S. Pat. No. 5,811,789 to Nix provides an invention which selectively focuses a head on the desired data layer of an multi-layer optical medium. In the Nix invention, an astigmatic cylindrical lens is placed in the path of light between the data bearing surface and the access head's photodiode array. The photodiode array generates a focus error signal ("FES") which is used by a servo assembly to bring the lens into focus on the appropriate information layer.

However, astigmatic focus is more difficult to accomplish on multi-layer optical disks than on single layer disks. In a disk have two or more layers, the information-storing layers of medium are closely spaced with all but the furthest information layer semi-transparent rather than entirely reflective. In a single layer system, all of the reflected light is caused by the reflection from that single layer. In a multi-layer system, when accessing the top information layer, only a portion of the reflected light is caused by a reflection from the top layer. Some light passes through the top layer to the second (and subsequent layers). These subsequent layers also reflect a portion of the light back to the astigmatic lens. These additional sources of reflected light keep the read-and-focus photo array detector from operating properly, rendering the focus error signal unreliable.

One solution is to use thick spacer layers between disk information layers. This introduces spherical aberration resulting in a larger spot and therefore in the end reducing the allowable information density. Another solution is to use an astigmatic detector lens that creates a "steep" FES S-Curve that goes through its peak and valley for less defocus motion. This results in a small spot at the quad detector, making the system more sensitive to lateral drifts.

What is needed is a system for a multi-layer optical storage unit which offers improved focus signal. Such a system should be economical and easy to implement without causing a degradation in spot quality at the disk or in the introduction of complicated assemblies. Ideally, what is needed is a way to remove the extraneous reflected light so that the photo array detector can function properly.

SUMMARY OF THE INVENTION

The invention is an auto-focus system for a DVD reader or other optical access unit which reads and/or writes information from/to at least two information layers on an optical storage medium such as a DVD or DVR. The auto-focus system includes an astigmatic lens which creates at least two focal line images. A confocal aperture is placed at the first focal line image created by the astigmatic lens. The placement of the confocal aperture allows extraneous out-of-focus light rays to be successfully blocked from reaching the photo detector array which together with detector electronics creates a focus error signal (FES). The FES drives a servo assembly connected to an access head of the optical access unit, bringing the access head into focus. In some embodiments, the confocal aperture is "bow-tie" shaped, allowing for simplified assembly and easing in-plane rotational alignment.

BRIEF DESCRIPTION OF THE DRAWINGS

FIGS. 4A and 4B illustrate the auto-focusing system of the present invention in action.

FIG. 5 shows the sensor assembly for a prior art astigmatic system.

DETAILED DESCRIPTION OF THE PREFERRED EMBODIMENTS

Figure 1:
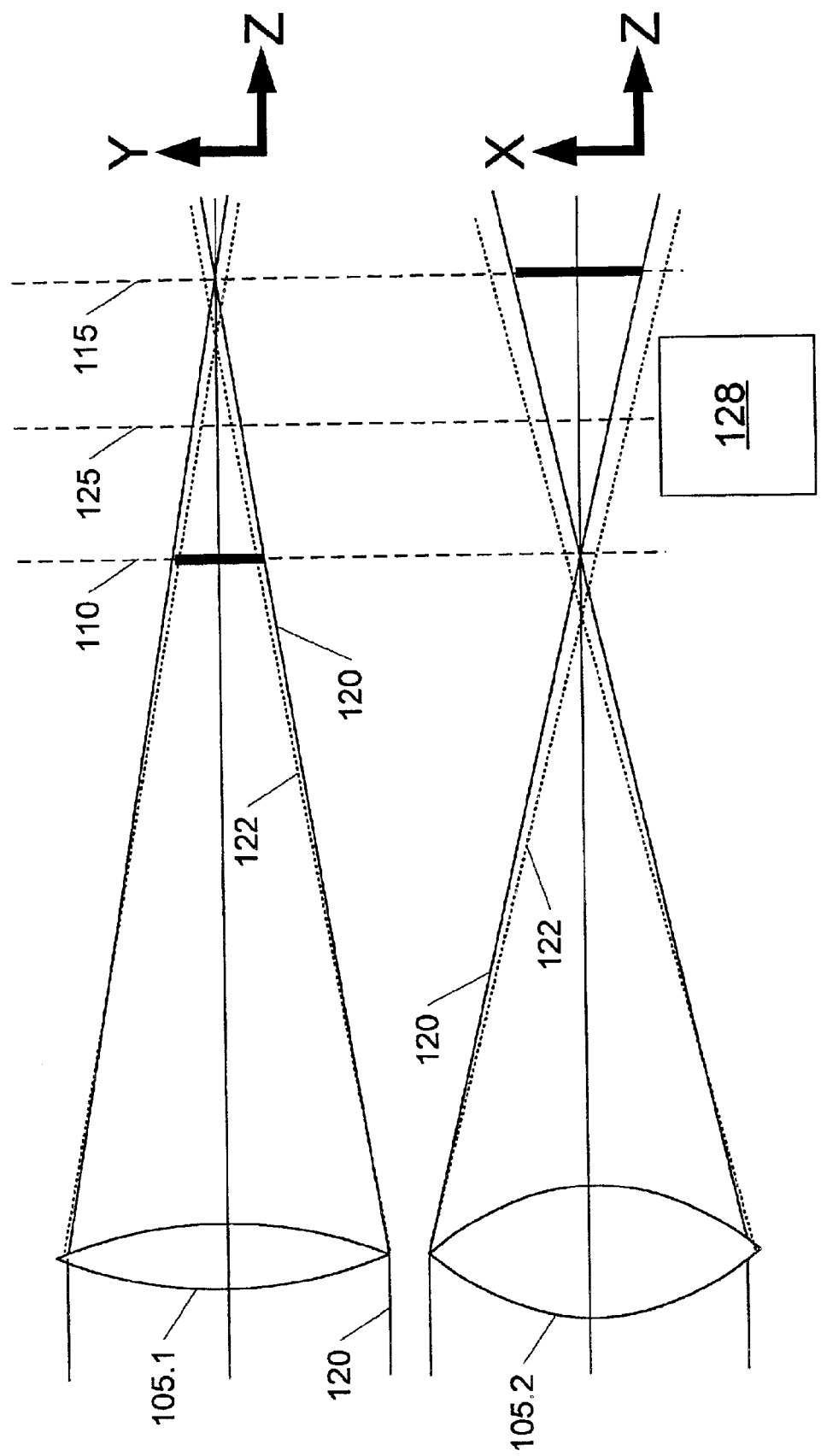
FIG. 1 is a prior art astigmatic system for auto-focusing a read/write access head.

In the following drawings, an attempt has been made to label like elements with the same element number. Referring to FIG. 1, a prior art astigmatic system for autofocusing a read/write access unit head in a multi-layer optical storage unit is shown. The cross-section of an astigmatic lens 105 is shown in FIG. 1 along its YZ-plane as element 105.1 and along its XZ-plane as element 105.2. While the system only has one astigmatic lens 105, the lens creates two focal line images—one in the YZ plane 110 and one in the XZ plane—for light rays 120 that are refracted by the lens 105. The path of light through the lens 105 can form a "circle of confusion" on a receiving surface. In the prior art, for a single layer optical disk, focus is generally set where the diameter of the circle of confusion is minimized—i.e, the circle of least confusion. This point appears at a sensor location 125 which is between the YZ focal line image 110 and the XZ focal line image 115. For an astigmatic lens 105 the circle of least confusion 125 is generally midway between the focal lines images.

FIG. 1 includes a focus detection system 128 which is aligned with the sensor location or circle of least confusion 125, and in which the astigmatic lens is placed in a return beam from the access unit head's objective lens. FIG. 5 shows focus detection system 128 in more detail. It includes a photodiode array detector 130 having four quadrants 135. When the lens 105 is properly focused, the light 120 forms a small circle of illumination at the center of the photo detector 130. However, when the light 120 is out of focus, it illuminates one or more of the quadrants of the photo detector 135 unevenly. This uneven illumination is sensed by amplifier 138 to produce a focus error signal ("FES") 140. The FES 140 is then fed to a servo loop that controls a servo actuator (not shown) which moves the lens 105 closer to or further away from the optical disk's surface, bringing it into focus.

As has been previously explained, in a dual-layer optical storage system, the spacer layers are semi-transparent, allowing light to reach each of the information layers and then to be reflected back to the lens 105. This extraneous, undesired light 122 causes the auto-focusing system of FIG. 1 to be unreliable as the photo detector array 130 receives both the expected light from the layer being accessed 120 as well as the undesired extraneous light 122.

The use of confocal apertures is known in the art. For example, confocal apertures are used in confocal microscopes. Such microscopes boast a 40% improvement in resolution as compared to traditional microscopes. Even more importantly, confocal microscopes offer improved contrast due to the elimination of out-of-focus glare.

The present invention removes the undesired extraneous light 122 from an astigmatic focus system by the use of a confocal aperture. By correctly positioning the confocal aperture, the present invention ensures that out-of-focus glare from the non-accessed layers is blocked so that the photo detector array 130 can operate correctly.

Figure 2:
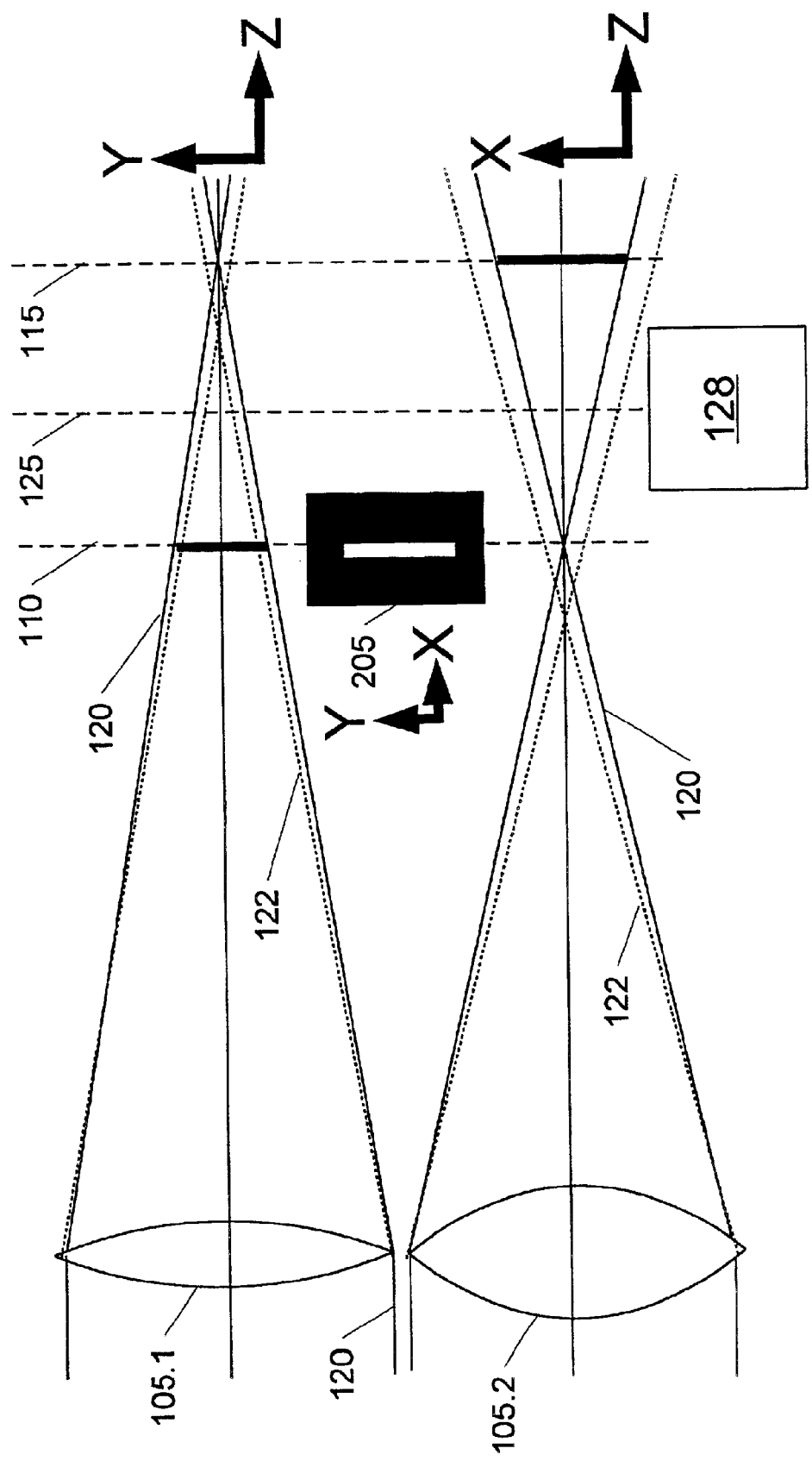
FIG. 2 is the present invention, combining an astigmatic auto-focus system with a confocal aperture.

FIG. 2 shows the present invention, which is an astigmatic focusing system with the addition of a confocal aperture 205 positioned at the first focal line image 110 created by the lens. When accessing the first information layer, the aperture 205 in the astigmatic focusing system of FIG. 2 generally blocks (most of) the light returning from the second information layer and passes all the light returning from the first information layer. When focusing on the second information layer, the aperture 205 generally blocks (most of) the light returning from the first information layer 122 and passes all the light returning from the second information layer. In both cases light returning from the addressed information is passed through the aperture 205, while light returning from the non-addressed layer is mostly blocked, thus enabling the generation of an appropriate Focus Error Signal.

Figure 3B:
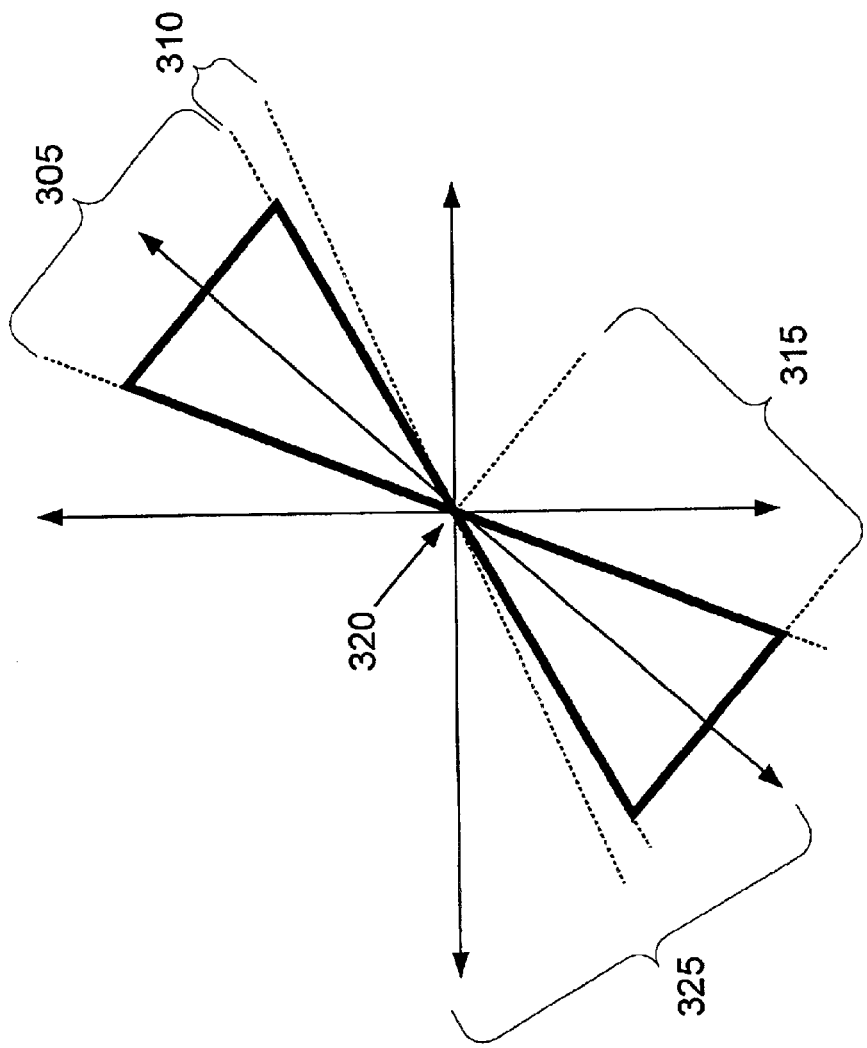
FIGS. 3A and 3B show one embodiment of a specially shaped confocal aperture in more detail.
Figure 3A:
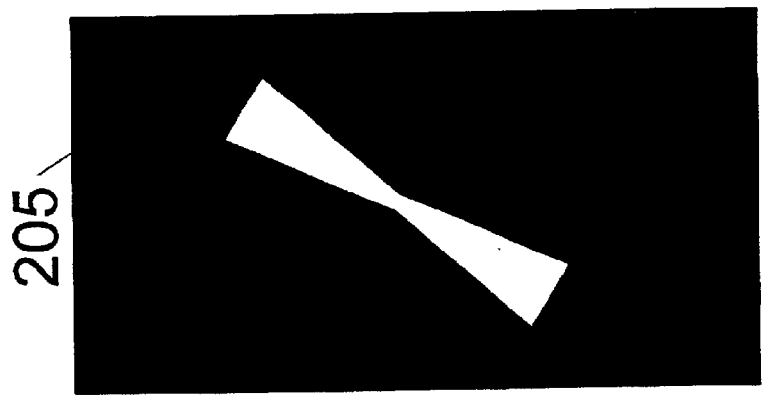

In some embodiments the confocal aperture 205 is mounted directly on the photo detector's cover 128. However, assembly is not easy. The aperture 205 must be precisely mounted and aligned in order to properly block the marginal light rays 122. To lessen the burden of installing and maintaining the aperture 205, some embodiments of the present invention include a specially shaped aperture. Traditionally, confocal apertures are rectangular slits or small pin holes. FIGS. 3A and 3B illustrate an enhanced confocal aperture which is shaped as a "bow tie." FIG. 3A shows a front plan view of the bow tie confocal aperture 205, named for its bow tie shaped opening. This shape eases manufacturing alignment and allows rotational tolerance of the astigmatic line with the aperture. As with the FES, in some embodiments, a feedback servo with a correction signal can be implemented with the aperture to properly align the bow tie slit in the X and Y plane. In an even more sophisticated correction system, the aperture could be moved along the z-axis to correct for tolerances in the z-direction. These correction systems allow smaller aperture slits, thus enabling to filter out more light of non-accessed disk layers.

The confocal aperture can be created on a glass plate. One preferred embodiment uses a six by three millimeter rectangular glass plate that is 1.0 mm +/−0.11 mm thick. In such an embodiment, the aperture is part of a mask applied to the glass plate. A covering, such as paint, is applied to the glass plate to make it opaque but for the bow-tie shaped aperture, which is left transparent.

FIG. 3B points out the detailed orientation of the bow-tie aperture 205 in one preferred embodiment. In such an embodiment, angle 305 is preferably generally 5 to 15 degrees. In this embodiment, the length of each of the halves 315 of the aperture is 0.4 mm +/−0.010 mm while the central opening in the aperture 320 is perhaps 0.015 mm +/−0.001 mm. The bow tie is sometimes placed on an angle (such as 45 degrees, as shown by element 325). Such an angle 325 is used in some systems to align the cylinder of the astigmatic lens under 45 degrees with the track on the information layer. As one skilled in the art will recognize, these dimensions can be altered to create different confocal apertures with similar or enhanced properties.

FIGS. 4A and 4B show the auto-focusing system of the present invention in action. In FIG. 4A, a cross section of an optical disk is shown having a substrate 415 protecting a first information carrying layer 405, a spacer layer 420, and a second information carrying layer 410. FIG. 4A illustrates accessing information from the first information layer 405 while FIG. 4B illustrates accessing information from the second layer 410. In FIG. 4B, while the light rays 120 reflected from the accessed layer pass through confocal aperture 205, most of the extraneous light rays 122 reflected from the non-accessed layer are successfully blocked by the aperture 205. In this way, the system can perform better auto-focusing as the circle of light illuminated upon the photo detector 130 is kept crisp and usable. Without the confocal aperture's assistance enough light 122 is reflected from the non-accessed layer to cause light to hit the photo detector 130, causing an incorrect focus error signal 140.

The present invention does not require that the forward beam to the objective lens and the return beam from the objective lens be collimated. Such systems are often called infinite conjugate systems. A diverging forward path of the beam and converging return beam can also be used, which is often called a finite conjugate system. Thus, the incoming objective beam to the astigmatic lens converges. In such a case, the focal line image moves closer to the astigmatic lens, requiring that the aperture be placed closer to the lens.

While the detailed description has addressed a system which accesses an optical medium having two information layers, the system can be readily adapted for mediums having more information layers—for example, three layers or four layers. In such a system, the use of an aperture and astigmatic lens would ensure that the light rays reflected from the addressed layer reach the photodiode array (or other focusing sensor) while most of the light rays reflected from the non-addressed information layers are blocked from reaching the photodiode array.

While the specification describes particular embodiments of the present invention, those of ordinary skill can devise variations of the present invention without departing from the inventive concept.

We claim:

1. An auto-focus system of an optical access unit for reading and writing data from and to a first information layer and a second information layer of an optical storage medium, the system comprising:
    an astigmatic lens which creates a first set of line images and a second set of line images, wherein the first set of line images comprises at least one line image for refracting light rays from the first information layer, and wherein the second set of line images comprises at least one line image for refracting light rays from the second information layer, and
    a confocal aperture placed at a first focal line image from the first set of line images created by the astigmatic lens, wherein the confocal aperture blocks the light rays reflected from the second information layer but not the light rays reflected from the first information layer when accessing the first information layer, and wherein the confocal aperture blocks the light rays reflected from the first information layer but not the light rays reflected from the second information layer when accessing the second information layer.

2. The auto-focus system of claim 1, wherein the confocal aperture is bow-tie shaped.

3. The auto-focus system of claim 1, further comprising a quadrant photodiode array placed generally in the circle of least confusion for the light rays refracted through the astigmatic lens.

4. The auto-focus system of claim 3, further comprising:
    a servo assembly connected to an access head of the optical access unit, for moving the access head to a proper position;
    wherein the servo assembly is electrically connected to the quadrant photodiode array.

5. The auto-focus system of claim 1, wherein the optical access unit comprises an objective lens,
    wherein the astigmatic lens is placed in a return beam from the objective lens, and
    wherein the objective lens is focused on the first information layer or the second information layer of the optical storage medium.

6. The auto-focus system of claim 1, wherein the optical access unit is a finite conjugate system.

7. An auto-focus system of an optical access unit for reading and writing data from and to a plurality of information layers of an optical storage medium having data stored on at least a first information layer, a second information layer, and a third information layer, the system comprising:
    an astigmatic lens which creates a first focal line image and a second focal line image for refracting light rays reflected from an addressed layer, wherein one of the information layers is the addressed layer and the remaining information layers are the non-addressed layers; and
    a confocal aperture placed at the first focal line image created by the astigmatic lens, wherein the confocal aperture passes the light rays reflected from the addressed layer, and blocks generally the light rays reflected from the non-addressed layers.

8. The auto-focus system of claim 7, wherein the confocal aperture is bow-tie shaped.

9. The auto-focus system of claim 7, further comprising a quadrant photodiode array placed generally in the circle of least confusion for the light rays refracted through the astigmatic lens.

10. The auto-focus system of claim 9, further comprising:
    a servo assembly connected to an access head of the optical access unit, for moving the access head to a proper position;
    wherein the servo assembly is electrically connected to the quadrant photodiode array.

11. The auto-focus system of claim 7, wherein the optical access unit comprises an objective lens,
    wherein the astigmatic lens is placed in a return beam from the objective lens, and
    wherein the objective lens is focused on the first information layer of the optical storage medium.

12. The auto-focus system of claim 7, wherein the optical access unit is a finite conjugate system.

13. An auto-focus system of an optical access unit for reading or writing data on a plurality of information layers of an optical storage medium, comprising:
    an astigmatic lens which creates a plurality of focal line images for refracting light rays reflected from an addressed layer from one of the plurality of information layers of the optical storage medium; and
    a confocal aperture placed at the one of the plurality of focal line images created by the astigmatic lens, wherein the confocal aperture passes the light rays reflected from the addressed information layer, and wherein the confocal aperture blocks generally the light rays reflected from the non-addressed information layers.

14. The auto-focus system of claim 13, wherein the confocal aperture is bow-tie shaped.

15. The auto-focus system of claim 13, further comprising a quadrant photodiode array placed generally in the circle of least confusion for the light rays refracted through the astigmatic lens.

16. The auto-focus system of claim 15, further comprising:

a servo assembly connected to an access head of the optical access unit, for moving the access head to a proper position;

wherein the servo assembly is electrically connected to the quadrant photodiode array.

17. The auto-focus system of claim 13, wherein the optical access unit comprises an objective lens, wherein the astigmatic lens is placed in a return beam from the objective lens, and wherein the objective lens is focused on the corresponding information layer of the optical storage medium.

18. The auto-focus system of claim 13, wherein the optical access unit is a finite conjugate system.

* * * * *